United States Patent [19]

Terai et al.

[11] 4,189,206
[45] Feb. 19, 1980

[54] OPTICAL SWITCHING DEVICE

[75] Inventors: Kiyoshi Terai, Tokyo; Kazuo Yakuwa; Shinya Okuda, both of Kawasaki; Keiji Tanaka, Yokohama; Takashi Ishikawa, Kawasaki, all of Japan

[73] Assignee: Fujitsu Limited, Japan

[21] Appl. No.: 885,995

[22] Filed: Mar. 13, 1978

[30] Foreign Application Priority Data

Mar. 14, 1977 [JP] Japan ................... 52-27703

[51] Int. Cl.² ................................................ G02B 5/14
[52] U.S. Cl. .................................. 350/96.20; 250/229
[58] Field of Search ............... 350/96.20; 250/229; 340/365 P

[56] References Cited

U.S. PATENT DOCUMENTS 4,152,043  5/1979  Albanese ........................... 350/96.20

FOREIGN PATENT DOCUMENTS 2531398  7/1976  Fed. Rep. of Germany ........ 350/96.20
1426475  2/1976  United Kingdom ................. 350/96.20
396830   1/1974  U.S.S.R. ............................. 350/96.20

OTHER PUBLICATIONS

Hale et al., article "Mechanical Optical-Fibre Switch" in *Electronics Letters*, vol. 12, No. 15, Jul. 1976, p. 388.
Leighton article, "Fiber Optic Shutter" in IBM Tech. Discl. Bull., vol. 11, No. 8, Jan. 1969, pp. 912-913.

*Primary Examiner*—Stewart J. Levy
*Attorney, Agent, or Firm*—Staas & Halsey

[57] ABSTRACT

An optical switching means including an optical fiber moving means which is moved by an electromagnetic force, a spring body which has a guide hole through which an optical fiber passes and at least one magnetic body. The magnetic body is fixed on one of its ends and one end is arranged so as to be almost parallel with the moving optical fiber. The moving optical fiber is connected with a fixed optical fiber by moving the magnetic body with an electromagnetic force, thereby effecting optical switching with low attenuation and high accuracy.

12 Claims, 21 Drawing Figures

OPTICAL SWITCHING DEVICE

BACKGROUND OF THE INVENTION

This invention relates to an optical switching device which may be used in the field of optical communications, more particularly to an optical switching device for switching the interconnection between a moving optical fiber and a fixed optical fiber. In such a device, the moving optical fiber is arranged so as to move in accordance with an external magnetic field. An example of a device having an optical switching function is the optical switch disclosed in the Japanese Laid-Open Publication No. 52-11945 (Japanese Patent Application No. 51-82869) filed by Siemens AG., Germany.

The optical switch, as disclosed in the Siemens' patent application, is designed to make or break the optical signal path by moving the position of the ends of optical fibers whose cut ends are placed face to face to each other. The switching is effected by exerting an external force on one of the optical fibers. Moreover, the above-noted reference also discloses the fact that a magnetic force may be used as the external force.

However, said optical switch described in the aforementioned patent application only performs an optical connection and disconnection function, and does not function to change the optical path. Moreover, since an optical fiber has a diameter as small as 100 μm, a highly accurate aligning technique is required for the connection of such an optical fiber. High accuracy optical connections are not considered in the aforementioned patent application. Accordingly, an optical switch in accordance with the Siemens' patent application has a high coupling attenuation.

Thus, there is a need for an optical switching device for use in switching optical paths and capable of establishing highly accurate coupling while providing a low coupling attenuation.

SUMMARY OF THE INVENTION

An object of this invention is to provide an optical switching device which is capable of accurately switching optical paths by guiding and driving a moving optical fiber using an elastic body having a guiding portion which moves in accordance with a driving magnetic field and thereby connecting the moving optical fiber to the fixed optical fiber.

Another object of this invention is to provide an optical switching element which is capable of switching optical paths by driving a moving optical fiber between fixed optical fibers provided at two positions.

Another object of this invention is to provide an optical switching element which simplifies the driving techniques used for optical path switching by connecting a permanent magnet to a pole element and providing a biasing field to said elastic body.

Another object of this invention is to provide an optical switching device which performs optical coupling with high accuracy by executing the alignment of said moving optical fibers and said fixed optical fiber at a circular groove contact portion or a V-groove contact portion.

Still another object of this invention is to provide an optical switching device which ensures excellent light coupling efficiency and absorbs the mechanical shocks of the optical fibers which occur while switching by injecting a liquid having a refraction coefficient similar to that of said fiber into a vessel holding said moving optical fiber, fixed optical fibers, elastic body and fiber aligning portion.

Another object of this invention is to provide an optical switching device which simultaneously switches plural optical paths by means of first and second fixed optical fibers of N in number respectively (with N≧2), and N moving optical fibers which move between said first and second optical fixed fibers.

Additional objects and features of the invention will appear from the following description in which the preferred embodiments of the invention have been set forth in detail in conjunction with the drawings.

BRIEF DESCRIPTION OF THE DRAWINGS

While the specification concludes with claims particularly pointing out and distinctly claiming the subject matter which is regarded as the invention, preferred embodiments are disclosed in the following detailed description taken in conjunction with the accompanying drawings, in which;

DESCRIPTION OF THE PREFERRED EMBODIMENTS

Figure 1A:
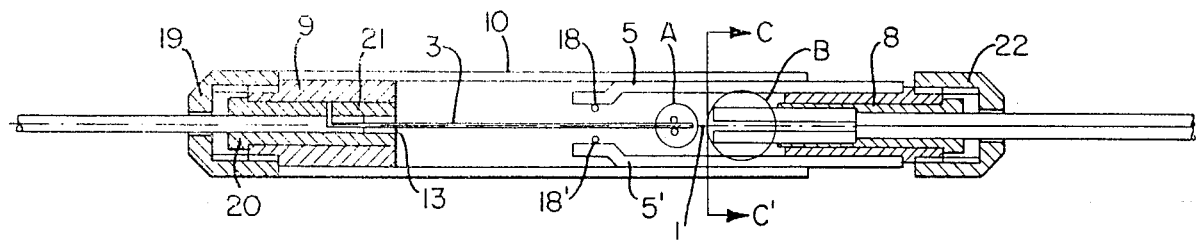
FIGS. 1(a), (b) are crossectional views of an embodiment of this invention.
Figure 2:
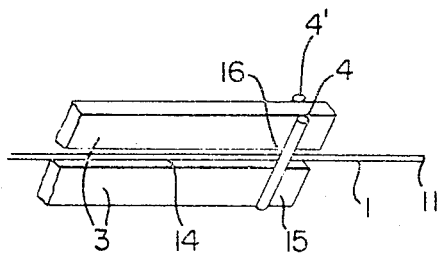
FIG. 2 is an enlarged perspective view of part A shown in FIG. 1(a).
Figure 3:
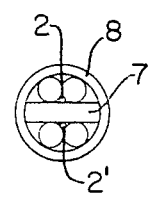
FIG. 3 is a crossectional view of the plane C-C' in FIG. 1(a).
Figure 4:
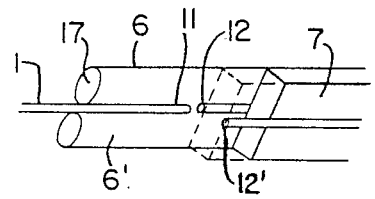
FIG. 4 is an enlarged perspective view of part B shown in FIG. 1(a).

FIGS. 1(a), (b) are crossectional views of an embodiment of this invention. FIG. 1(a) and (b) respectively show the crossectional views with the planes crossing at right angles. FIG. 2 is an enlarged perspective view of the part A as shown in FIG. 1(a). FIG. 3 is a crossectional view of the plane C-C' in FIG. 1(a). FIG. 4 is an enlarged perspective view of the part B as shown in FIG. 1(a). In FIGS. 1(a), (b), the driving coil, which is a necessary feature of the structure of an embodiment of this invention, is omitted so as to simplify the explanation of the operation of the invention. FIG. 6 illustrates the mounting of the driving coil, which will be described later.

In FIGS. 1 to 4, numeral 1 represents a moving optical fiber; 2, 2', fixed optical fibers; 3, magnetic elastic body herein called the contact pole; 4, 4', fiber guide round bars; 5, 5', pole bars; 6, 6', round bars with dents; 7, spaces; 8, holding tube which holds the spaces 7 and round bars 6, 6'; 9, plate; and 10, cover.

For the basic operation of the switch, the moving optical fiber 1 is moved and its end 11 is switched between the ends 12, 12' of the fixed optical fibers 2, 2'. Thus, the optical route can be switched between the moving optical fiber 1-fixed optical fiber 2 and moving optical fiber 1-fixed optical fiber 2'. For this purpose, the contact pole 3, consisting of a magnetic material, is fixed at the fixed end 13 of said moving optical fiber 1 and in parallel with said moving optical fiber 1. The free end of the moving optical fiber is guided through the slit 14 provided on the contact pole 3. The moving optical fiber 1 is inserted into the fiber guide hole 16 formed by the fiber guide round bars 4, 4' provided at the free end 15 of the contact pole 3. The contact pole 3 is magnetically operated from the outside, thereby causing the moving optical fiber to move via the guide hole 16 provided on the contact pole 3.

In the existing methods, since the moving optical fiber has its own mass and the mass causes a deflection in the optical switch element mounting direction, accurate switching operation is impossible and a deviation of the optical axis of alignment for the optical connection results. Thus, attenuation losses become large.

However, in a device in accordance with the present invention as illustrated by this embodiment, since the deflection of the moving optical fiber is kept within a resonable range by means of the contact pole 3 and guide hole 16, and since the alignment of the end of the moving optical fiber and the end of the fixed optical fiber occurs in the groove formed at the contact portion of the round bars 6, 6', accurate switching and alignment can be effected.

In this embodiment, by forming the contact pole 3 of a magnetic material, a device can be designed without considering position of the magnetic material to be driven, thereby allowing the device to be easily driven.

The pole bars 5, 5' can be omitted or simplified when no bias field is provided for the position of contact pole 3, thereby allowing the optical switching element to be easily fabricated. However, in such a case, the current direction of the current flowing through the driving coil must be reversed for each switching operation in order to reverse the direction of electromagnetic field.

In one embodiment, as noted in the explanation for the switch of FIG. 6, a specified magnetic bias field is applied to the contact pole 3 by using a permanent magnet and the moving optical fiber 1 is usually connected to the fixed optical fiber 2. At the time that the optical route is changed, a driving current flows in a specified direction through the coil in order to provide an inverted electromagnetic field, thus causing the moving optical fiber 1 to be connected to the fixed optical fiber 2'. Thus, a undirectional current can be provided to the driving coil, and driving the coil so as to change the optical path can be easily effected. The pole bars 5, 5' and contact pole 3 are positioned face to face with a gap between them at a certain facing area so that a certain operation can be performed. The contact areas are provided with nonmagnetic materials 18, 18' in order to eliminate direct contact of the pole bars 5, 5' and the contact pole 3. The above mentioned gap, (i.e.—the distance between the fixed optical fibers 2, 2'), is 1 mm in this embodiment. The fixing and positioning of the fixed optical fibers 2, 2' can be accomplished by providing round bars 6, 6' having the same roundness and setting the optical fibers at the bottom of the dent in the coupling area. The round bars 6, 6' are positioned face to face via the spacer 7. At this time, the ends 12, 12' of the fixed optical fibers 2, 2' are set respectively at the same distance from the end 17 of the round bars 6, 6'.

The diameter of the round bars 6, 6' can be determined by the following equation:

$$\Phi = \cos(\pi/6) \times \phi/(1 - \cos(\pi/6))$$

where, $\phi$ is the diameter of the optical fiber.

The free end portion 11 of the moving optical fiber 1 is guided to the guide hole 16 provided at the contact pole 3 at the time of the switching operation and then reaches the dent of the round bars 6, 6' for positioning the fixed optical fiber 2. The moving optical fiber 1 then stops with very little flexing, thereby allowing a highly accurate alignment with the fixed optical fiber 2. At this time, the stiffness of the contact pole 3 in this embodiment is $\pm 0.5$ g/mm. The distance between the moving optical fiber end 11 and fixed optical fiber ends 12, 12' at the time of coupling is 30 to 50 $\mu$m in this embodiment.

Figure 14:
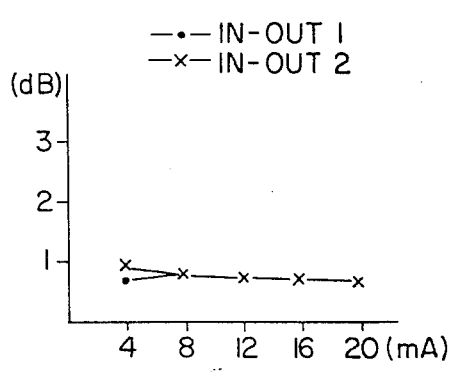
FIGS. 14 to 17 illustrate the attenuation characteristics of the light switching element as related to this invention.
Figure 15:
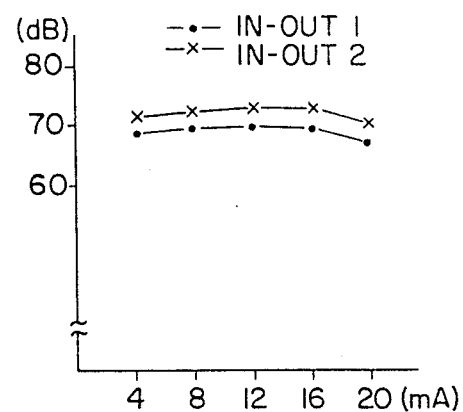

The axis alignment ensures reproduceability for repeated operations and results in a highly efficient connection. The experimental results are shown in FIGS. 14 and 15, which will be explained later.

The aforementioned operating portions of the optical switch are placed in a hermetically sealed capsule made of glass, plastic and metal materials in order to reduce the influence of external ambient conditions. A liquid having the same refraction coefficient as the optical fibers may be injected into the capsule in order to improve the coupling efficiency at the optical fiber ends and to alleviate the mechanical shock generated when the moving optical fiber 1 collides with the round positioning bars 6, 6'.

In FIG. 1(a), 19 is a protecting tube for moving optical fiber 1; 20, a holding tube for holding the moving optical fiber 1 and contact pole 3; 21, a clamping plate which clamps the contact pole 3; 22, a holding tube which holds the fixed optical fibers 2, 2'.

Stainless steel is the material used in this embodiment for the fiber guide round bars 4, 4'; non-magnetic glass is the material used for round bars 6, 6' and spacer 7; aluminum, or other non-magnetic material is used for holding tube 8 and plate 9; and a transparent glass is used for cover 10.

Moreover, aluminum is used for protection tube 19; a magnetic material of iron and nickel alloy for holding tube 20 and clamping plate 21; and aluminum for protection tube 22. This embodiment of the invention is 80 mm in the longitudinal direction and has an 8.6 mm cover diameter, for example.

In this embodiment, a round bar is used as the aligning circular groove, but a V-shape groove may also be used for alignment.

As for the driving operation of this device, switching can be achieved by mounting a magnet to the round pole bar, providing a magnetic flux in one direction, winding a coil around the capsule and changing the magnetic excitation direction of the coil.

Figure 5:
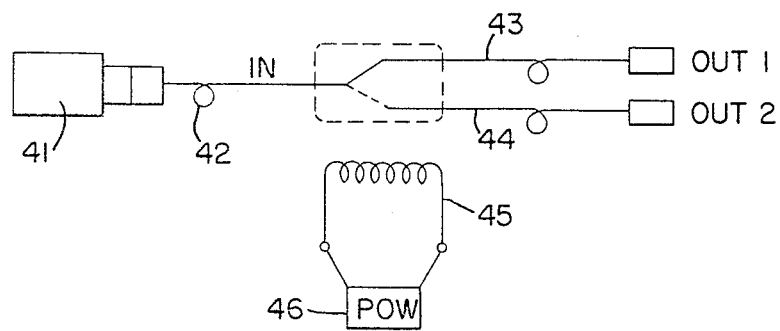
FIG. 5 is a simplified block diagram of the driving system for the switching operation.

FIG. 5 shows a simplified block diagram of a model of the driving system for performing the switching operation. In this figure, 41 is the light source; 42, a portion corresponding to the moving optical fiber; 43, 44, portions corresponding to the fixed optical fibers; 45, a coil for generating an external magnetic field; and 46, the power supply.

The optical route is switched by moving the elastic magnetic body in dependence upon changes in the direction of excitation effected through the control of the current flowing through the coil 45. The elastic magnetic body has the fiber guide hole which guides the portion 42 corresponding to the moving optical fiber.

Figure 1B:
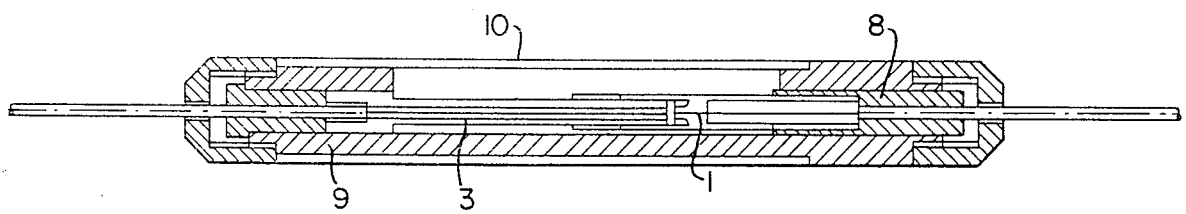

In the embodiment of this invention shown in FIG. 1, the driving coil has 18000 turns and the winding resistance is 3.8 kohms. Moreover, in order to make the bending losses of the moving optical fiber so small that they can be ignored, the bending curvature of the optical fiber is set at 30 mm or more.

Figure 6A:
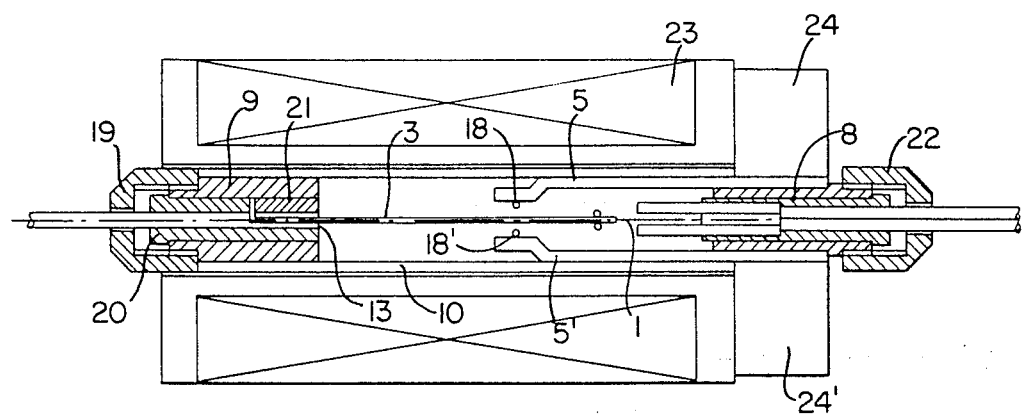
FIGS. 6(a), (b) are crossectional views of an embodiment of this invention and illustrate the mounting of the driving coil.
Figure 6B:
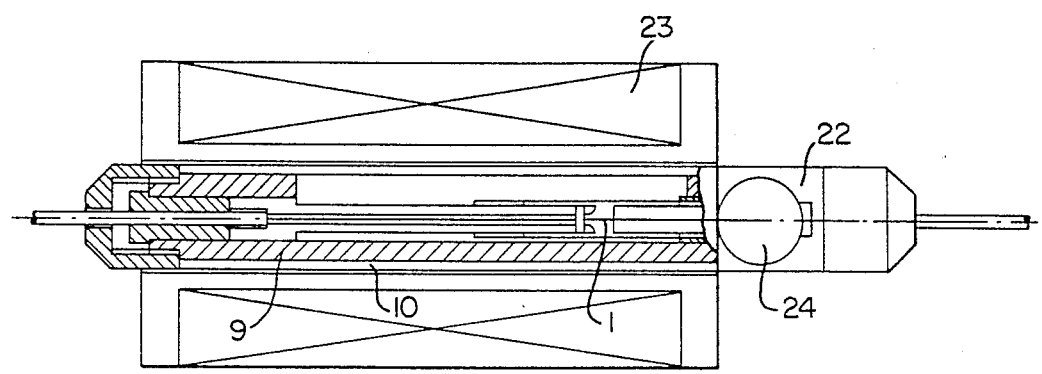

FIGS. 6(a), (b) show an embodiment of this invention and illustrate the mounting of the driving coil. FIGS. 6(a), (b) correspond to the embodiment shown in FIGS. 1(a), (b) and illustrate how the coil is mounted. Like features illustrated in both FIGS. 1(a), (b) and 6(a), (b) have been given the same numerical designations. In FIG. 6(a), (b), 23 is a driving coil and 24, 24' are permanent magnets. The driving coil 23 in these figures corresponds to the coil 45 shown in FIG. 5 and the switching of the optical route can be effected by controlling the current fed through to the coil.

Figure 7:
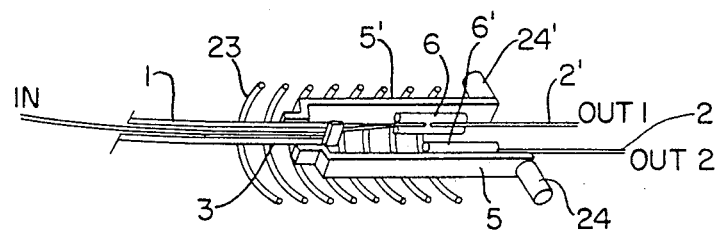
FIG. 7 is a perspective view of a major portion of an embodiment of this invention.

FIG. 7 shows a perspective view of a major portion of an embodiment of this invention. This figure illustrates a perspective view of the mounting of the driving coil as shown in FIGS. 6(a), (b). The fixing and supporting portions of the moving optical fiber, the fixed optical fibers, the contact pole, and the cover are omitted. The numbers provided in this figure correspond to those provided in FIGS. 6(a), (b) and like numbers correspond to like features. Numeral 1 denotes the moving optical fiber; 2, 2', fixed optical fibers' 3 contact pole; 5, 5', pole bars; 6, 6', round positioning bars; 23, driving coil; 24, 24', permanent magnets.

The designations IN, OUT 1, OUT 2, used in FIG. 7, respectively correspond to the designations IN, OUT 1, OUT 2, used in FIG. 5. In addition, the driving operation features of FIG. 7 are omitted since they are the same as that shown in FIGS. 1 to 4.

Figure 8A:
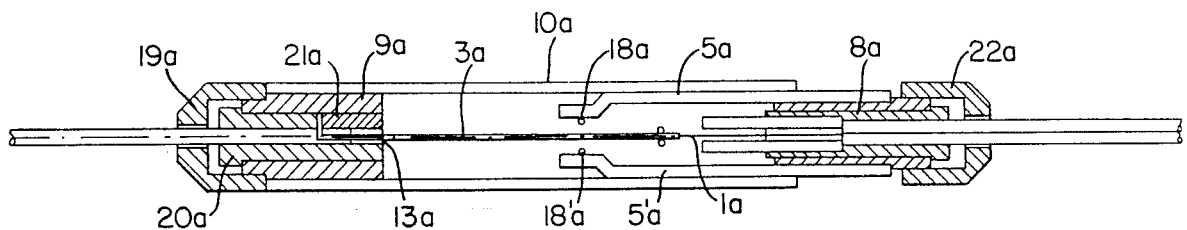
FIGS. 8(a), (b) are crossectional views of another embodiment of this invention.
Figure 8B:
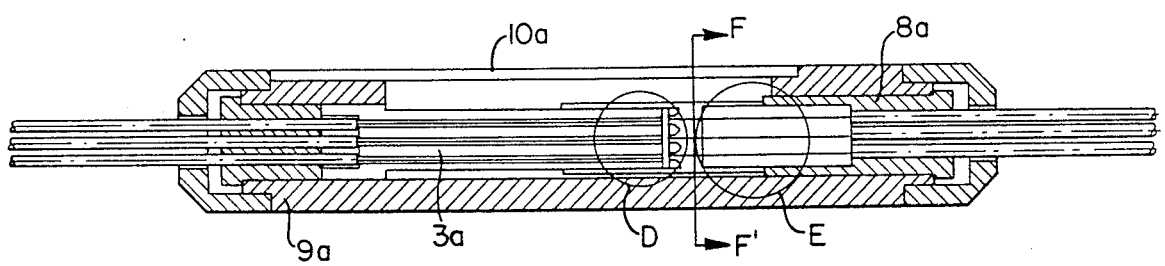
Figure 9:
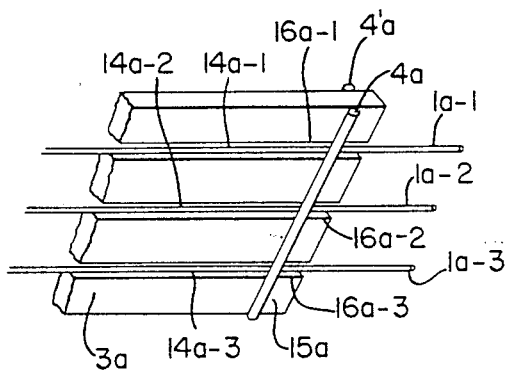
FIG. 9 is an enlarged perspective view of part D shown in FIG. 8(b).
Figure 10:
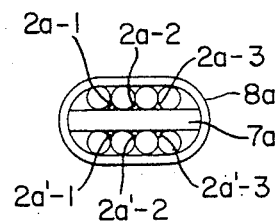
FIG. 10 is a crossectional view of plane F-F' in FIG. 8(b).
Figure 11:
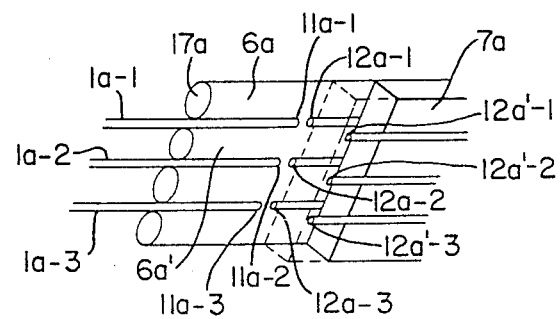
FIG. 11 is an enlarged perspective view of part E shown in FIG. 8(b).

FIGS. 8(a), (b) are crossectional views of another embodiment of this invention. In this embodiment, plural optical paths for optical switching are employed (three paths in this case). FIGS. 8(a) and (b) are respectively crossectional views at the plane where the paths cross at right angles. FIG. 9 is an enlarged perspective view of part D of FIG. 8(b). FIG. 10 is a crossectional view of the plane F-F' of FIG. 8(b). FIG. 11 is an enlarged perspective view of part E of FIG. 8(b). In FIGS. 8(a), (b), the driving coil is omitted so as to simplify the explanation of the operation of the switch. FIG. 12 illustrates the mounting of the driving coil, which will be explained later.

Numerical designations provided in FIGS. 8 to 11 respectively correspond to those provided in FIGS. 1 to 4. However, the designation "a" is added to each numerical designation provided in FIGS. 1 to 4. In other words, $1a$-1, $1a$-2, $1a$-3, $2a$-2, $2a$-3, $2'a$-1, $2'a$-2, $2'a$-3, $3a$, . . . respectively correspond to 1, 2, 2', 3, . . . provided in FIGS. 1 to 4.

In FIGS. 8 to 11, $1a$-1, $1a$-2, $1a$-3 are three moving optical fiber groups, $2$-$a$-1, $2a$-2, $2a$-3 and $2'a$-1, $2'a$-2, $2'a$-3 are fixed optical fiber groups corresponding to the moving optical fiber groups, and $3a$ is a magnetic and elastic body, herein called the contact pole. Elements $4a$ and $4'a$ are round fiber guide bars; $5a$, $5a'$, pole bars; $6a$, $6'a$, round bars, forming a dent groove; $7a$, spacer; $8a$, holding tube which holds the spacer $7a$ and round bars $6a$, $6'a$; $9a$, plate; $10a$, cover. $11a$-1, $11a$-2, $11a$-3 are edge portions of the moving optical fibers; $12a$-1, $12a$-2, $12a$-3, $12'a$-1, $12'$-2, $12'a$-3 are edge portions of the fixed fibers. The moving optical fibers $11a$-1, $11a$-2, $11a$-3 respectively move between $12a$-1, $12a$-2, $12a$-3 and $12'a$-1, $12'a$-2, $12'a$-3 to thereby switch the optical path. Element $13a$ is the fixed edge of the moving optical fiber; $14a$-1, $14a$-2, $14a$-3 are slits; $15a$ is moving edge of the contact pole 3; $16a$-1, $16a$-2, $16a$-3 are fiber guide holes; $17a$ is edge portion of round bar $6a$; 18, $18'a$ are non-magnetic materials; $19a$ is a protection tube for moving optical fiber $1a$; $20a$ is a holding tube which holds the moving optical fiber $1a$ and contact pole $3a$; $21a$ is a clamping plate for contact pole $3a$, $22a$ is a holding tube which holds the fixed optical fibers $2a$-1, $2a$-2, $2a$-3 and $2'a$-1, $2'a$-2, $2'a$-3.

Explanation of the driving operation is omitted since it is the same as that explained in conjunction with FIGS. 1 to 4. The materials used are also the same as those used in FIGS. 1 to 4.

Figure 12A:
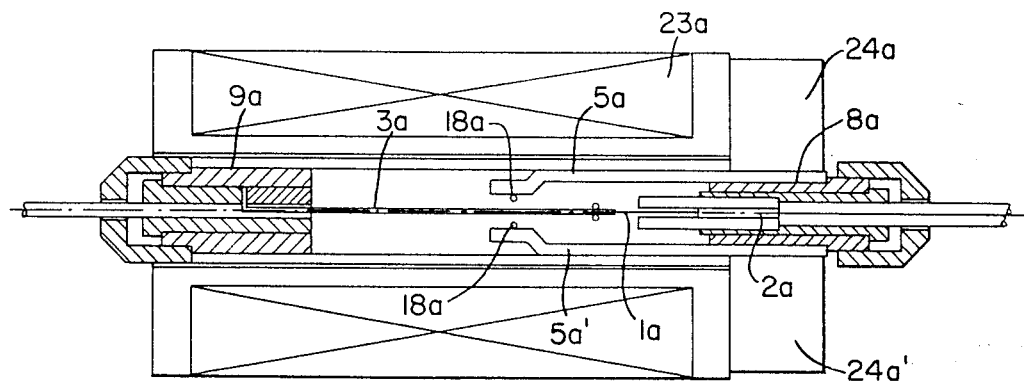
FIGS. 12(a), (b) are crossectional views of another embodiment of this invention and illustrate the mounting of the driving coil.
Figure 12B:
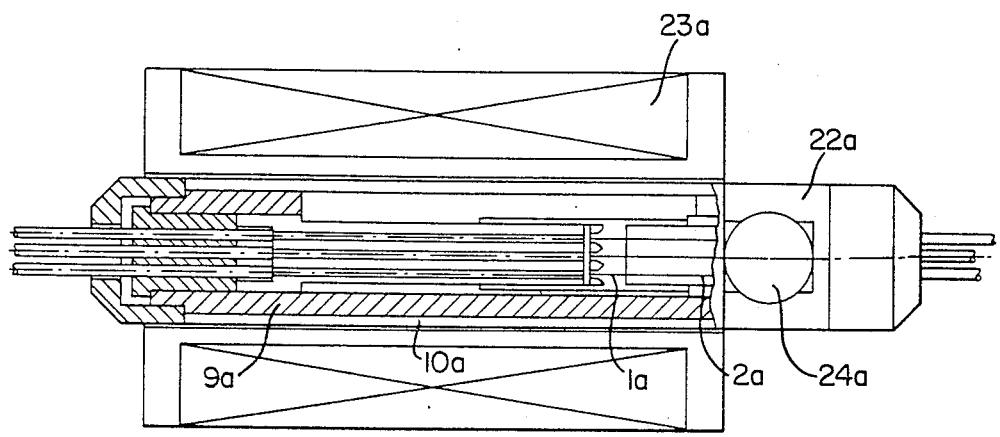

FIGS. 12(a), (b) illustrate the embodiment shown in FIG. 8 but in this case, illustrates the mounting of the driving coil. In FIGS. 12(a), (b), like elements corresponding to those in FIG. 8 have the same numerical designations.

In FIGS. 12(a), (b), $23a$ is a driving coil; $24a$, $24'a$, permanent magnets. The driving coil $23a$ in FIGS. 12(a), (b) corresponds to the coil 45 in FIG. 5, and the switching of the optical path can be effected by controlling the current applied to the driving coil. Elements $1a$, $2a$ are respectively moving optical fiber groups and fixed optical fiber groups, while $3a$ is contact pulse group.

Figure 13:
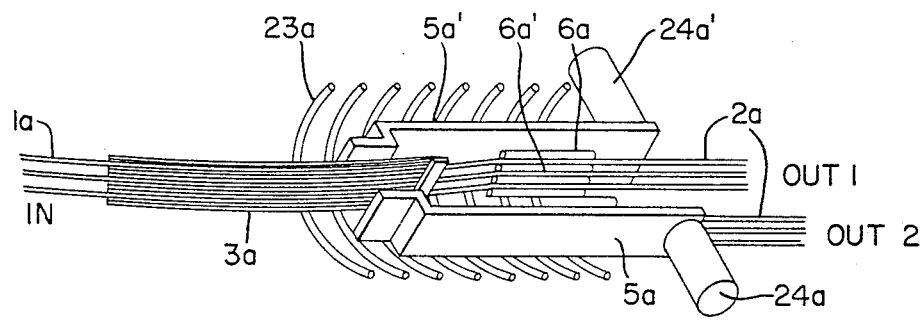
FIG. 13 is a perspective view of a major portion of another embodiment of this invention.

FIG. 13 is the perspective view of a major portion of the embodiment shown in FIG. 12, and illustrates the mounting of the driving coil as in the case of FIG. 7. In FIG. 13, the fixed portion of the moving optical fiber, the contact pole, the fixed optical fiber, and the cover are omitted. The numerical designations in FIG. 13 correspond to those of FIG. 12, and like elements have the same numerical designations.

Element $1a$ is the moving optical fiber group; $2a$ is the fixed optical fiber group; $3a$ is the contact pole group; $5a$, $5a'$ are pole bars; $6a$, $6'a$ are round bars for positioning; $23a$ is the driving coil, and $24a$, $24'a$ are permanent magnets.

Designations IN, OUT 1, OUT 2 is FIG. 13 correspond to the designations IN, OUT 1, OUT 2 of FIG. 5.

Figure 16:
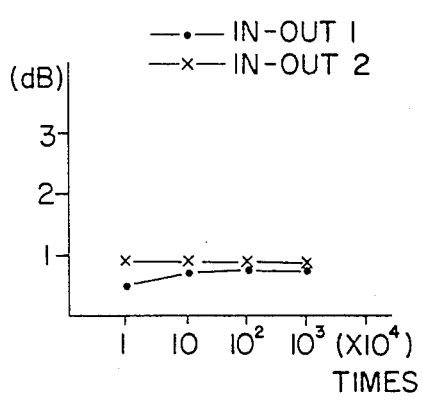
Figure 17:
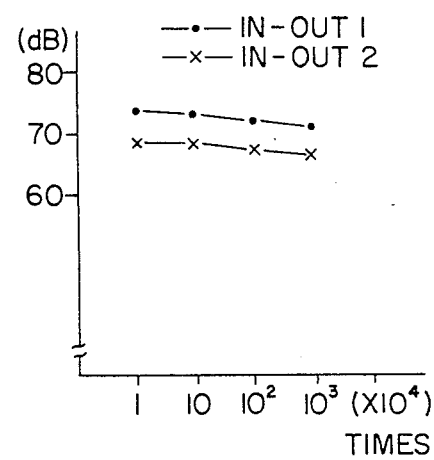

FIGS. 14 to 17 show the insertion loss and leakage attenuation of the optical switching element used in embodiments of this invention. FIGS. 14 and 16 respectively show the insertion loss characteristics while FIGS. 15 and 18 show the leakage attenuation characteristics. The Y-axis (vertical axis) of FIGS. 14 to 17 represents attenuation (dB), while the X-axis (horizontal axis) of FIGS. 14 and 15 represents driving current (mA). The X-axis of FIGS. 16 and 17 represents the number of times the switch is operated. Optical fibers having step indices are used.

From FIGS. 14 and 15, it can be seen that the switching operation is possible when there is a driving current of 4 mA, the insertion loss is about 1 dB, and the leakage attenuation is 68 dB or more. The insertion loss of 10 samples ranged between 0.2 and 1.9 dB.

FIGS. 16 and 17 show the results of the operating life test. From FIGS. 16 and 17, it is apparent that the variation of the insertion loss during the repeated operation of 500 million times is within 0.5 dB and the variation of the leakage attenuation is within 5 dB. Moreover, the variation of the insertion loss due to temperature variations within the range of 0° C. to 50° C. is within 0.2 dB. Furthermore, the switching speed of the optical switching element in accordance with this invention is 2.5 ms.

What is claimed is:

1. An optical switching device for switching an optical path comprising:
   a first fixed optical fiber;
   a supporting portion with a groove in the longitudinal direction, for supporting said fixed optical fiber;
   a moving optical fiber, having one end fixed and one end free, arranged to be optically connected with said fixed optical fiber;
   elastic body means, arranged parallel to said moving optical fiber, and having a guide portion for guiding said moving optical fiber at a position near its free end; and,
   a driving coil for providing said elastic body means with an electromagnetic force, whereby said elastic body aligns the free end of said moving optical fiber with said supporting plate, and whereby said fixed optical fiber and said moving optical fiber are connected optically.

2. An optical switching device as in claim 1, further comprising a second fixed optical fiber arranged to be optically connected to said moving optical fiber, wherein when a predetermined current is applied to said driving coil, said free end of said moving optical fibers is moved, whereby the optical connection is changed from between said moving optical fiber and said second fixed optical fiber to between said moving optical fiber and said first fixed optical fiber.

3. An optical switching device as in claim 1, further comprising a pole bar having a permanent magnet attached thereto for providing a magnetic bias field to said elastic body means.

4. An optical switching device as in claim 1 wherein said elastic body means comprises first and second elastic bars, and a bar body is bridged between the area near to the free end of said first and second elastic bars as said guide portion.

5. An optical switching device as in claim 4, wherein said first and second elastic bars are formed of a magnetic material.

6. An optical switching device as in claim 4 wherein said bar body is formed of a magnetic material.

7. An optical switching device as in claim 4 wherein said first and second elastic bodies and said bar body are formed of a magnetic material.

8. An optical switching device as in claim 1, wherein said supporting portion is formed with a round bar contact area.

9. An optical switching device as in the claim 1 wherein said groove in the longitudinal direction of said supporting portion is a V-shaped groove.

10. An optical switching device as in claim 1, further comprising a cover for sealing said moving optical fibers, said fixed fibers, said elastic body means and said supporting portion with groove in the longitudinal direction; and wherein said driving coil is arranged around said cover.

11. An optical switching device as in claim 10, further comprising a liquid for injecting into said cover, said liquid having a refraction coefficient similar to that of said optical fiber.

12. An optical switching device for switching optical paths, comprising:
   a first N fixed optical fiber group and a second N fixed optical fiber group, N being an integer not less than two;
   a supporting portion with a groove in the longitudinal direction for supporting said first and second fixed optical fiber groups;
   N moving optical fiber groups each fiber of each group having one end fixed and its free end optically connected with one fiber of one of either said first or second fixed fiber groups;
   elastic body means provided in parallel with each of said moving optical fiber group and having a guide portion for guiding each of said moving optical fiber group in the area near its free end; and,
   a driving coil for providing said elastic body means with an electromagnetic force, whereby said elastic body aligns the free ends of each of said moving optical fibers of each of said moving optical fiber groups with said supporting portion and whereby said fixed optical fibers and said moving optical fibers are connected optically.

* * * * *